July 30, 1963 W. R. KENNEDY ET AL 3,099,778
SEQUENTIALLY ENERGIZED PLURAL MOTOR CONTROL SYSTEM
Filed Jan. 10, 1958
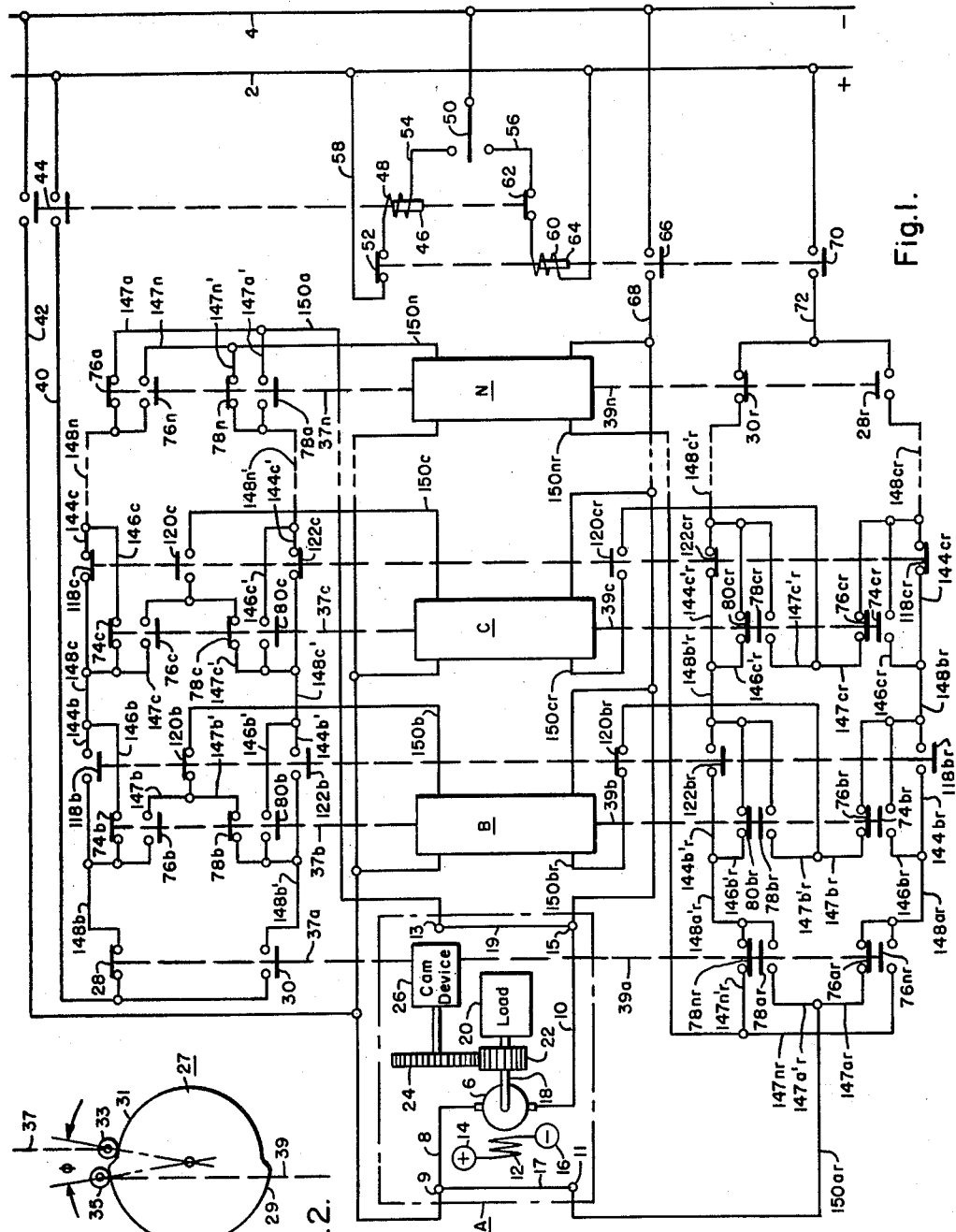
WITNESSES:
Bernard R. Gieguay
INVENTORS
Wilson R. Kennedy and
Raymond E. Spencer.
BY
ATTORNEY United States Patent Office 3,099,778
Patented July 30, 1963

3,099,778
SEQUENTIALLY ENERGIZED PLURAL MOTOR
CONTROL SYSTEM
Wilson R. Kennedy, Bethel Park, and Raymond E. Spencer, Pittsburgh, Pa., assignors to Westinghouse Electric Corporation, East Pittsburgh, Pa., a corporation of Pennsylvania
Filed Jan. 10, 1958, Ser. No. 708,112
14 Claims. (Cl. 318—102)

This invention relates to control systems and more particularly to a control system for energizing and deenergizing a plurality of electroresponsive devices in a predetermined sequence.

In the past, there have been many systems proposed for sequentially energizing and deenergizing a plurality of electroresponsive devices. Most of these systems, however, utilize time delay circuits to perform the sequential operation or require manual input of deenergizing signals. In all instances, however, separate control systems are necessitated to perform the sequential operation of the devices. The present invention eliminates the need for reliance upon time delay devices by the provision of a more reliable position responsive means for each electroresponsive device to deenergize itself and also energize the next device in the sequential pattern. The invention also provides means for operating the electroresponsive devices in an opposite direction and in a reverse sequence. Operation of a plurality of devices in a predetermined sequence finds utility in many arts, such for example, as in an airport runway lighting system in which a plurality of spaced lamps are energized to serve as a guide for incoming planes. Another system in which the invention finds utility is a control for a neutronic reactor in which it has been found advantageous to energize the drive motors of the reactor control rods in a predetermined sequence and to energize the drive motors in an opposite direction in a reverse sequence so that the last control rod to be inserted into the core will be the first to be removed therefrom.

Accordingly, one object of this invention is to provide a new and improved control means for energizing and deenergizing a plurality of electroresponsive devices in a predetermined sequence.

Another object of this invention is to provide a new and improved control means to energize a plurality of electroresponsive devices in one direction in a predetermined sequence, and means to energize the devices in another direction in reverse sequence.

Another object of this invention is to provide a new and improved control means for sequentially energizing and deenergizing a plurality of electroresponsive devices and having means for bypassing any of the devices.

A further object of this invention is to provide a new and improved control means for energizing and deenergizing a plurality of electroresponsive devices in a predetermined sequence, in which each the operating devices deenergizes itself at the end of its operation and energizes the next device to be operated.

These and other objects of my invention will become more apparent upon consideration of the following detailed description of a preferred embodiment thereof, when taken in conjunction with the attached drawing in which:

FIGURE 1 diagrammatically illustrates a sequence control system embodying the invention; and FIG. 2 is an enlarged view of the cam device used in the control system shown in FIG. 1.

Referring to the drawing, there is shown a plurality of electroresponsive devices connected to direct current buses through a plurality of relays and switches. For purposes of illustration, the electroresponsive devices in this instance are depicted as motors each connected to a load through a gear mechanism, which gear mechanisms are also connected to and operate a cam device. Each cam device is mechanically connected to certain switches so that after a predetermined number of revolutions of a motor, its cam device operates its associated switches to deenergize the operating motor and thereby energize the next motor to be operated in the sequence.

In FIG. 1, one of the electroresponsive devices is shown to be bypassed by the manual operation of certain other switches in the system. There is also shown means for operating the electroresponsive devices in one direction in a sequential manner, and additional means for operating the electroresponsive devices in the opposite direction in a reverse sequence. Additionally, there is provided an interlocking circuit whereby it is impossible to energize the electroresponsive devices in opposite directions at the same time.

More specifically, the present invention provides a positive current bus 2 and a negative or ground bus 4. The direct current buses 2 and 4 are connected to a plurality of electroresponsive devices A, B, C and N through a switching circuit. For purposes of illustration, the electroresponsive device A is shown in detail and the devices B, C and N are merely illustrated as boxes, but preferably contain the same apparatus as is shown for device A.

The electroresponsive device A comprises a direct current motor 6 having armature winding leads 8 and 10 connected thereto. The motor 6 may comprise any conventional direct current motor and is provided with a separately energized shunt coil 12 connected to an external direct current source provided at terminals 14 and 16. As shown in the drawing, terminal 14 is provided with a positive D.C. voltage and terminal 16 is connected to ground. While the energization of terminals 14 and 16 may be reversed, it is essential that the direction of current flow through shunt coil 12 be maintained the same throughout operation of the electroresponsive device. The motor 6 is provided with a rotor shaft 18 directly connected to a load 20. Armature lead 8 is connected directly to terminal 9 and then to terminal 11 by a conductor 17, and armature lead 10 is connected directly to terminal 15 and also to terminal 13 by a conductor 19.

As will hereinafter be more fully described, the armature winding of the motor 6 will be energized with one polarity by current from terminals 13 and 9 through conductor 19, lead 10, the armature winding of motor 6, and lead 8, respectively. On the other hand, the armature winding of motor 6 will be energized with an opposite polarity by current from terminals 11 and 15 through conductor 17, lead 8, the armature winding of motor 6 and lead 10, respectively.

A shaft gear 22 is directly coupled to a cam operating gear 24, and the latter is coupled to a cam device 26. The cam device 26 operates a plurality of selected cam switches in the following manner. Rotation of the motor 6 causes rotation of the shaft gear 22 which in turn rotates cam gear 24 to then rotate the cam device. For purposes of illustration, the gear ratio between cam gear 24 and shaft gear 22 is made 2 to 1 so that upon one complete revolution of the rotor of motor 6, the cam device 26 completes one-half of the revolution and operates some of its associated cam relays to deenergize the motor 6.

The cam device 26 comprises a rotatable cam 27 (FIG. 2) having a high surface 29 and a low surface 31. The high and low surfaces 29 and 31 each comprise about one-half of the circumference of the cam 27. Two cam followers are located adjacent the circumference of the cam 27 of which the forward cam follower is depicted by the reference character 33 and the reverse cam follower is indicated by numeral 35. Each of the cam followers 33 and 35 is located adjacent the circumference of the cam 27 and may be spring loaded downwardly in a conventional manner (not shown) so as to be movable into engagement with the high and low surfaces of the cam upon rotation of the latter. The cam followers 33 and 35 are spaced along the circumference of the cam 27 and are separated from each other by an angle $\phi$, which angle is made as small as practically possible. The forward cam follower 33 is mechanically connected to switches in the forward sequence circuits by means of a shaft 37, and the reverse cam follower is analogously connected to switches in the reverse sequence circuits by means of a shaft 39. For purposes of illustration, the cam 27 is rotated counterclockwise as depicted by the arrow 41 when the motor 6 is rotated by power delivered through the forward sequence circuits and moves in a clockwise direction upon rotation of the motor 6 by power delivered through the reverse sequence circuits. The cam followers, as illustrated in FIG. 2, are positioned at the beginning of the cycle of rotation of the motors 6 by power furnished through the forward sequence circuits so that the forward cam follower 33 is located on the low surface 31 and the reverse cam follower 35 is located on the high surface 33. Accordingly, when the cam 27 is rotated through an angle $\phi$, the reverse cam follower 35 will be moved to engage the low surface 31 and its associated cam switches will be thrown into their lower positions.

The load 20 may comprise a rotatable commutator connected to energize a plurality of rod drive motors, each of which operates to rectilinearly move a control rod for a neutronic reactor. An illustration of a load of this type may be found in the copending application of Garland M. Lilly, Serial No. 719,426, filed March 5, 1958, which application is assigned to the same assignee as the present invention.

For purposes of clarity, all switches and relays having their contacts open at the positions thereof illustrated in FIG. 1 will be defined as open and all switches and relays having their contacts bridged will be defined as closed. Switches, circuits and cam means located in the circuits of a particular operating device A, B, C and N will be depicted by the suffix *a*, *b*, *c* and *n*, respectively, and switches located in the forward sequence operating circuits will have no additional suffix, while those located in the reverse sequence operating circuits will have an additional suffix *r*.

Electrical current from buses 2 and 4 is provided to switches 28 and 30, and terminal 9 of device A by means of supply conductors 40 and 42, respectively. Supply conductors 40 and 42 are provided with normally open relay contacts 44 which break the circuit between the buses 2 and 4 and the devices. Relay contacts 44 may be biased open and operated to closed position by a conventional relay operating means having a core 46 and an energization coil 48. The coil 48 may be connected to bus 4 by lead 54 through operating switch 50, and may be connected to bus 2 by a lead 58 through relay contacts 52 therein. The operating switch 50 may comprise a conventional three-position manually operated switch which connects bus 4 to lead 54 of coil 48 in one operative position and connects bus 4 to lead 56 in the energizing circuit of another relay coil 60 in another operative position. There is a third position of operating switch 50 which is an open circuit position intermediate the two operative positions at which neither coil 48 nor coil 60 is energized. The core 46 is also mechanically connected to relay contacts 62 located between lead 56 and coil 60. When coil 48 is deenergized, relay contacts 44 are open and supply conductors 40 and 42 are deenergized. When this condition exists, relay contacts 62 are closed so that coil 60 may be energized through lead 56 and switch 50. Relay coil 60 operates a core 64 which is mechanically connected to the relay contacts 52 located between lead 58 and coil 48 so that when coil 60 is deenergized relay contacts 52 are closed. Core 64 is also mechanically connected to relay contacts 66 located between bus 4 and another supply conductor 68 and to relay contacts 70 located between bus 2 and a supply conductor 72. When coil 60 is deenergized, relay contacts 66 and 70 remain open. Supply conductors 40 and 42 are adapted to be connected to buses 2 and 4, respectively, and provide current of one polarity to the armature windings of the motors 6, while supply conductors 68 and 72 are adapted to be connected to buses 4 and 2, respectively, to provide current of an opposite polarity to the armature windings of the motors 6. This invention provides for an interlocking circuit whereby current to the armature of motor 6 cannot be applied in both directions at the same time. When switch 50 is operated to connected lead 54 to bus 4, coil 48 is energized to closed relay contacts 44 and energize the supply conductors 40 and 42. By energizing coil 48, relay contacts 62 are then opened so that energization of coil 60 cannot take place. When switch 50 is operated to connect lead 56 to bus 4, coil 48 is deenergized and closes the relay contacts 62 and opens the relay contacts 44 to deenergize the supply conductors 40 and 42. Coil 60 is then energized, closing relay contacts 66 and 70 to energize supply conductors 68 and 72, and also opening relay contacts 52 to insure against energization of coil 48.

Referring to FIG. 1, it is to be noted that the switches therein are presently set so that devices A, B and N will be operated in sequence in one direction by circuits 40 and 42 and that the devices A, B, and N will be energized in reverse sequence by circuits 68 and 72. Device C is represented as being bypassed in the energization sequence. Cam device 26 of device A operates a set of cam switches 28 and 30 mechanically connected to forward cam follower 33*a* by a shaft 37*a*, and also operates a set of reverse cam switches 78*nr*, 78*ar*, 76*ar* and 76*nr*, which are mechanically connected to the reverse cam follower 35*a* by a shaft 39*a*. Cam switch 28 is shown closed and cam switch 30 is shown open. When motor 6 of device A is rotated for one full revolution, forward cam follower 33 will be moved into engagement with the high surface of its cam to open cam switch 28 and close cam switch 30. Initially cam switches 78*nr* and 76*ar* are closed and cam switches 78*ar* and 76*nr* are in their open positions. Upon rotation of the motor 6 through the angle 2$\phi$, the reverse cam follower will be moved into engagement with the low surface of its cam and the shaft 39*a* is moved downwardly to open cam switches 78*nr* and 76*ar* and to close cam switches 78*ar* and 76*nr*.

Analogously, the forward cam follower of device B operates a set of cam switches 74*b*, 76*b*, 78*b*, and 80*b* by means of a shaft 37*b*. Cam switches 74*b* and 78*b* are initially closed and cam switches 76*b* and 80*b* are initially open. The reverse cam follower of device B is connected to a shaft 39*b* which operates initially closed cam switches 80*br* and 76*br* and initially open cam switches 78*br* and 74*br*.

Device C is provided with a forward cam follower which is connected to a shaft 37*c* and operates initially closed cam switches 74*c* and 78*c* and initially open cam switches 76*c* and 80*c*. Device C is also provided with a reverse cam follower which operates initially closed cam switches 76*cr* and 80*cr* and initially open cam switches 74*cr* and 78*cr* by means of a shaft 39*c*. Similarly, the cam device of device N is provided with a forward cam follower connected to a shaft 37*n* for operating initially closed cam switches 76*a* and 78*n* and initially open cam switches 76*n* and 78*a*, and a reverse cam follower connected to a shaft 39*n* for operating initially closed cam switch 30*r* and an initially open cam switch 28*r*. It is to be noted that the cam followers for the devices B, C and N operate in an analogous manner to the cam followers for device A. Each of the aforementioned cam switches are two-position, open or closed devices and each set of cam switches are mechanically connected to their cam followers by their respective shafts so that the operation of one set of cam switches by its cam follower will move its shaft to throw each of its switches from one position to their other positions.

Device B is provided with another set of switches to bypass the device in the programming circuit. The bypass set of switches for device B comprises closed switches 120b and 120br and open switches 118b, 122b, 122br and 118br. The bypass switch set also comprises two-position open or closed switches which are mechanically connected together and may preferably be manually operated to remove device B from the sequence. Device C is provided with a similar set of bypass switches comprising closed switches 118c, 122c, 122cr and 118cr and open switches 120c and 120cr. The bypass switches for device B are illustrated in positions to main device B in the program sequence whereas the bypass switch set for device C is illustrated in position to bypass device C from the program sequence. The invention, as illustrated herein, does not provide means for bypassing devices A and N; however, it is to be realized that these devices may be provided with bypass circuits in a manner similar to that shown for devices B and C.

It is also to be noted that the illustration of this invention merely shows a method of sequentially operating four electroresponsive devices. The invention, however, may include any number of devices which can be inserted between devices C and N as illustrated by the dotted lines between the two last-mentioned devices.

The supply conductor 42 connects bus 4 to the terminals 9 of each of the devices A, B, C and N. In order to energize the armature windings of the devices A, B, C and N, by way of lead 10, terminal 13 must be energized by current flowing from bus 2 through the control conductors. Energization of lead 10 and terminal 13 is achieved by operating switch 50 to connect bus 4 to lead 54 to thereby close relay contacts 44. The supply conductor 40 may be connected to either of two bridging circuits 148b and 148b' through cam switches 28 and 30, respectively. The cam switches 28 and 30 are alternately opened and closed so that the terminals 13 of each of the devices A, B, C and N are energized through either bridging conductor 148b or 148b'. The bridging conductors 148b and 148b' may be connected to bypass conductors 144b and 144b', respectively, through bypass switches 118b and 122b, respectively. In the event it is desired to bypass device B, the bypass switches 118b and 122b are closed. If device B is to be energized in the sequential pattern, the bypass switches 118b and 122b are located in their open positions. The bridging conductors 148b and 148b' may also be connected to shunt conductors 146b and 146b', respectively, through cam switches 74b and 80b, respectively. The shunt conductors 146b and 146b' are connected to the bypass conductors 144b and 144b' to shunt the bypass switches 118b and 122b respectively. The cam switches 74b and 80b are opened alternately. When cam switch 74b is closed, cam switch 80b is open so that if current is furnished to conductor 146b, device B will not be operated. On the other hand, if current is transmitted to device B through shunt conductor 146b', device B will be operated as hereinafter described. The bridging conductor 148b may also be connected to a transition conductor 147b through an initially open cam switch 76b, and bridging conductor 148b' may be connected to a transition conductor 147b' through an initially closed cam switch 78b. The two transition conductors 147b and 147b' are each connected to an energization conductor 150b through the bypass switch 120b. The energization conductor 150b is in turn connected to terminal 13 of device B. It is to be noted that cam switches 74b and 76b are also opened alternately so that if power is being furnished to bridging conductor 148b, this power will be transmitted to either shunt conductor 146b or transition conductor 147b. Analogously, power furnished to the bridging conductor 148b' is transmitted to the shunt conductor 146b' or the transition conductor 147b' in the same manner. Since the terminal 13 of device B is energized by the energization conductor 150b, it is essential that the bypass relay 120b be closed in order to operate device B in the sequence. Alternatively, if the bypass switch 120b is open, device B will not be energized. It is also to be noted that when the bypass switch 120b is open, the bypass switches 118b and 122b are closed, and thereby, power is not transmitted to device B but is transmitted to the next device to be sequentially operated.

Device C is provided with similar conductors as is device B, wherein analogous conductors are followed by the suffix c instead of the suffix b. Electrical power, therefore, is provided to the conductors of device C alternately through bridging conductors 148c and 148c'.

Power may be furnished to device N alternatively through bridging conductors 148n and 148n'. The bridging conductors 148n and 148n' may be connected to a transition conductor 147a through the cam switch 76a and to a transition conductor 147a' through the cam switch 78a, respectively. The transition conductors 147a and 147a' may be connected to an energization conductor 150a which is in turn connected to terminal 13 of device A. The bridging conductors 148n and 148n' may also be connected to transition conductors 147n and 147n' through cam switches 76n and 78n, respectively. The transition conductors 147n and 147n' may both be connected to the energization conductor 150n. Cam switches 76a, 76n, 78a, 78n are operated by the cam device of device N. The switches are operated so that switches 76a and 78n are open or closed at the same time and switches 76n and 78a, also open and close at the same time. Thus, when the bridging conductor 148n is energized, either energization conductor 150n or 150a is energized and, correspondingly, when the bridging conductor 148n' is energized, energization conductors 150a and 150n are alternately energized.

The following depicts the scheme for energization of the devices A, B, C and N by both bridging conductors 148b and 148b'. Sequential energization of a single electroresponsive device is achieved by alternately energizing bridging conductors 148b and 148b'. The first energization of the devices will be called the first pass while the second energization of the devices will be called the second pass.

*Energization of Device A—First Pass*

When relay 44 is closed bus 2 energizes supply conductor 40 which in turn energizes the bridging conductor 148b, connected to one side of the closed cam switch 28. The bridging conductor 148b is not connected to the bypass conductor 144b because bypass switch 118b is open, but is connected to the shunt conductor 146b through the closed cam switch 74b. Current then passes from the bridging conductor 148b to the shunt conductor 146b and then to the bridging conductor 148c. The bridging conductor 148c is connected to the bypass conductor 144c through closed bypass switch 118c and also to the shunt conductor 146c through the closed cam switch 74c. Both conductors 144c and 146c are thereby energized and are connected to the next bridging conductor 148n. The bridging conductor 148n is connected to the energization conductor 150a through closed cam switch 76a. The energization conductor 150a is in turn connected to terminal 13 of device A. The motor 6 of device A then rotates for 2φ revolutions until its reverse cam follower engages the low surface of its cam to move the shaft 39a downwardly to close cam switches 78ar and 76nr and open cam switches 76ar and 78nr. The motor 6 continues to rotate until its forward cam follower engages the high surface of its cam to move shaft 37a upwardly to open switch 28 and to close switch 30 and thereby deenergize the motor 6 of device A.

Energization of Device B—First Pass

The supply conductor 40 is now connected to the bridging conductor 148b' through the closed cam switch 30. Current now passes from the bridging conductor 148b' to the transition conductor 147b'. The latter conductor energizes the energization conductor 150b which in turn energizes terminal 13 of motor 6 of device B so its motor 6 rotates for 2ϕ degrees to open cam switches 80br and 76br and close cam switches 74br and 78br. Motor 6 continues to rotate until its cam follower engages the high surface of its cam to move the shaft 37b upwardly to open cam switches 74b and 78b and to close the cam switches 76b and 80b. The opening of the cam switch 78b deenergizes the motor of device B.

Energization of Device C—First Pass

As previously pointed out, device C is shown having its bypass switches 118c and 122c closed to bypass the device from the operating sequence. The bypass switch 120c is now in an open position to prevent energization of device C through energization conductor 150c. If the set of bypass switches for device C were thrown in their other position, device C would be energized in the same manner as was device B.

Energization of Device N—First Pass

Circuit 40 is now connected to the bridging conductor 148b' through closed cam switch 30. Since cam switch 80b is closed, current now flows from bridging conductor 148b' to the shunt conductor 146b'. The shunt conductor 146b' in turn energizes the bridging conductor 148c' which in turn energizes the bypass conductor 144c' through the closed bypass switch 122c. The bypass conductor 144c' is connected to the transition conductor 147n' by the bridging conductor 148n'. Since cam switch 78n is closed, the transistion conductor 147n' is, therefore, energized. The transition conductor 147n' is connected directly to energization conductor 150n to energize device N. The motor of device N rotates for one revolution and the cam device 26 thereof opens the cam switches 76a, 78n and 30r and closes the cam switches 76n, 78a and 28r in the manner previously described. Since the cam switch 78n is opened, device N is deenergized.

It has been shown above how devices A, B and N are sequentially energized by one means. The sequence of energization of the devices will continue after the deenergization of device N in a similar manner, which manner is denoted as the second pass.

Energization of Device A—Second Pass

Current now flows to terminal 13 of device A from the supply conductor 40 to the bridging conductor 148b' through the closed cam switch 30. The bridging conductor 148b' energizes the shunt conductor 146b' through the closed cam switch 80b which in turn energizes the bridging conductor 148c'. The bridging conductor 148c' energizes the energization conductor 150a through the bypass conductor 144c', the bridging conductor 148n' and the transition conductor 147a', respectively. Device A is operated for one revolution of its motor until cam switches 28, 78nr and 76ar are closed and cam switches 30, 78ar and 76nr are opened by cam device 26. The set of cam switches for device A have now returned to the positions shown in FIG. 1.

Energization of Device B—Second Pass

The supply conductor 40 energizes the energization conductor 150b of device B by the bridging conductor 148b through the closed cam switch 28 and the transition conductor 147b through the closed cam switch 76b. Device B is then operated until the cam device 26 of device B throws its switch set so that the cam switches 76b, 80b, 78br and 74br are opened and the cam switches 74b, 78b, 80br and 76br are closed. The set of cam switches of device B have now returned to the positions shown in FIG. 1.

Energization of Device C—Second Pass

Device C still remains bypassed inasmuch as the bypass switch 118c is closed and the bypass switch 120c is open. If the set of bypass switches were in their other position, device C would not operate in turn during this pass but would operate in turn on the next pass since cam switch 76c is open and cam switch 74c is closed.

Energization of Device N—Second Pass

The energization conductor 150n is energized by the supply conductor 40 through the closed cam switch 28, the bridging conductor 148b, the closed cam switch 74b, the shunt circuit 146b, the bridging circuit 148c, the closed bypass switch 118c, the bypass circuit 144c, the closed cam switch 74c, shunt circuit 146c, the bridging circuit 148n, the closed cam switch 76n and the transition circuit 147n. The motor of device N is operated for one revolution until cam switches 76n, 78a and 28r are opened and cam switches 76a, 78n and 30r are closed. The cam switches for device N have then returned to the position shown in FIG. 1.

Since the sets of cam switches for the devices A, B and N have returned to the positions shown in the drawing, sequential operation of devices A, B and N may be continued, for the devices will be sequentially energized by repeating the steps of the first and second passes, respectively. It is to be noted that operation of the devices by supply conductors 40 and 42 provides positive current to armature lead 10 and negative current to armature lead 8, respectively. Operation of the motor 6 in the opposite direction is accomplished by providing the armature winding lead 8 with positive current and the armature winding lead 10 with negative current. The reverse operation circuitry is otherwise analogous to the forward operating circuitry and, accordingly, circuits have been numbered alike, but are followed with the suffix r.

It is to be noted that the devices A, B, C and N may be operated in the reverse direction by merely reversing the polarity of leads 40 and 42. This, however, would merely continue the operation of the devices in the same sequence. In order to operate the devices in a reverse sequence, it is required that separate energizing circuits be provided. The latter circuits are shown in the lower part of FIG. 1 and are substantially analogous to the energizing circuits of the forward sequence. Accordingly, supply conductor 68 is analogous to supply conductor 42 and supply conductor 72 is analogous to supply conductor 40. For reverse operation of the devices, devices A, B, C and N operate in an opposed manner, that is as devices N, C, B and A.

As shown in the illustration device A is the first device to be operated in the sequence; accordingly, it may be seen that device N was the last to be sequentially operated and, therefore, will be the first to be operated in reverse sequence.

Terminal 15 of device N is adapted to be continuously energized by bus 4 through the supply conductor 68 when contacts 66 are closed. Upon movement of the operating switch 50 to connect bus 4 to lead 56, relay contacts 66 and 70 are closed and an energization conductors 150nr of device N is energized by bus 2 through the supply conductor 72, a bridging conductor 148c'r, a bypass conductor 144c'r and a shunt conductor 146c'r, a bridging conductor 148b'r, a shunt conductor 146b'r, a bridging conductor 148a'r and a transition conductor 147n'r. Similarly if devices B or A were the last to be operated in the forward sequence, they would be the first to be operated in the reverse sequence with one exception.

The one exception to the above feature of the reverse sequence operation of the devices comes into effect when a device is deenergized from its forward sequence operation before its motor has rotated the initial 2ϕ degrees. In this instance, its reverse cam follower has not as yet moved its cam switches to their other position. Then, the previously operated device will be the first to be operated in the reverse sequence. This exception will also take place in switching from the reverse sequence to the forward sequence before the last operated motor has rotated an initial 2φ degrees. It is to be further noted, however, that the angle φ is made as small as possible to minimize the above occurrence. Additionally, by using a separate cam for each of the cam followers, the above exception can be eliminated.

Devices N, C, B and A are also energized by a first and second pass through different switches in an analogous manner to the operation of the devices in the second pass of the forward sequence. It is also to be noted that a conventional cam device 26 will operate its associated set of cam switches upon one revolution of the motor 6 irrespective of the direction of rotation of the motor 6.

Analogously, still another feature of the invention is that in switching from the reverse sequence to the forward sequence, the last motor to be operated in the reverse sequence will be the first motor operated by the forward sequence unless, of course, the motor is deenergized before it rotates an initial 2φ degrees for reason hereinbefore described.

The present invention, therefore, provides a novel and reliable position means for operating a plurality of devices sequentially wherein each device automatically deenergizes itself and energizes the next device in the sequence. One method of accomplishing this result has been illustrated as a cam device which opens and closes a plurality of selected switches. The invention also provides a means for bypassing particular devices from the sequential operation and also provides for energization of the devices with currents of opposite polarity in the reverse sequence wherein the last device to be operated in one direction is the first device to be operated in the opposite direction. Additionally there has been shown means for preventing the energization of the devices with currents of opposite polarity at the same time.

Since numerous changes may be made in the above described construction, and different embodiments of this invention may be made without departing from the spirit and scope thereof, it is intended that all matter contained in the foregoing description or shown in the accompanying drawing shall be interpreted as illustrative, and not in a limiting sense.

We claim as our invention:

1. A control means for effecting the automatic operation of a plurality of electroresponsive devices in a predetermined sequence, each of said devices having at least two energizing circuits for causing operation of said devices in one direction, each of said devices always having at least one of said two energizing circuits open, means operated by each of said devices to open its closed energizing circuit and substantially simultaneously to close an open energization circuit of the next succeeding device in said sequence.

2. A control means for effecting the automatic operation of a plurality of electroresponsive devices in a predetermined sequence comprising, at least two sets of interconnected energizing circuits for each of the devices for causing operation of said devices in one direction and each set having a plurality of contacts therein, each of said devices always having at least one of said two energizing circuits open, position responsive means operated by each of said devices to operate a predetermined number of said contacts at a predetermined position during its operation substantially simultaneously to open its closed energizing circuit to deenergize itself and to close one of the energizing circuits of the next succeeding device in said sequence to energize the latter, respectively.

3. A control means for effecting the automatic operation of a plurality of rotatable electroresponsive devices in a predetermined sequence comprising, a rotating member on each of said devices, at least two interconnected energization circuits for each of the devices for causing operation of said devices in one direction and each circuit having a plurality of contacts therein, each of said devices always having at least one of said two energizing circuits open, cam devices operated by said rotating members, respectively, and each connected to operate a predetermined number of said contacts at a predetermined position during its operation substantially simultaneously to open its closed energizing circuit to deenergize its device and to close one of the energizing circuits of the next succeeding device in said sequence to energize the latter.

4. A control means for effecting the automatic operation of a plurality of electroresponsive devices in a predetermined sequence comprising, a pair of interconnected energizing circuits for each of the devices for causing operation of said devices in one direction, each energizing circuit having a plurality of contacts therein, a set of said contacts being closed to energize the first device through one of its energizing circuits, means on said first device to open one of said set of contacts to deenergize itself and substantially simultaneously to close a contact in one energizing circuit of the next succeeding device in said sequence to energize the latter, means on each device, except the first, to operate others of said contacts to open its said one of its energizing circuits in response to energization thereof through said circuit to deenergize itself and substantially simultaneously to close one energizing circuit for the succeeding device in said sequence to energize the latter device and simultaneously to close a contact in the other of its energizing circuits and to open a contact in the other energizing circuit of the next succeeding device.

5. A control means for effecting the automatic operation of a plurality of electroresponsive devices in a predetermined sequence comprising, a pair of interconnected energizing circuits for each of the devices for causing operation of said devices in one direction, each energizing circuit having a plurality of contacts therein, a set of said contacts being closed to energize the first device through one of its energizing circuits, means on said first device responsive to operation thereof to open one of said set of contacts to deenergize itself and simultaneously to close a contact in one energizing circuit of the next succeeding device in said sequence to energize the latter, means on each device, except the first to operate others of said contacts to open its said one of its energizing circuits in response to energization thereof through said circuit to deenergize itself and to close one energizing circuit for the succeeding device in said sequence to energize the latter and simultaneously to close a contact in the other of its energizing circuits and to open a contact in the other energizing circuit for the next succeeding device, said last-mentioned means on the last of said devices connected to close another contact in the other energizing circuit of said first device in response to energization of said last device to energize said first device through its other energizing circuit.

6. A control means for effecting the automatic operation of at least three electroresponsive devices in a predetermined sequence comprising a supply circuit, each of said devices having an energizing circuit connected to said supply circuit, means operated by each of said devices to open its energizing circuit and close the energization circuit of the next succeeding device in said sequence, and at least some of said devices each having means operable to maintain its energizing circuit open and to connect the energizing circuit of the next succeeding device to said supply circuit to bypass the device preceding said next succeeding device from said sequence.

7. A control means for effecting the automatic operation of a plurality of rotatable electroresponsive devices in a predetermined sequence comprising, a supply circuit, a rotating member on each of said devices, interconnected energization circuits for each of the devices connected to said supply circuit and having a plurality of contacts therein, cam devices operated by said rotating members, respectively, and connected to operate a predetermined number of said contacts at a predetermined position during its operation to deenergize its device and to energize the next succeeding device in said sequence, and each of said devices, except the first and the last, having means operable to maintain its energizing circuit open and to connect the energizing circuit of the next succeeding device to said supply circuit to bypass the device preceding said next succeeding device from said sequence.

8. A control means for effecting the automatic operation of a plurality of electroresponsive devices in a predetermined sequence comprising, a pair of interconnected energizing circuits for each of the devices, each energizing circuit having a plurality of contacts therein, a set of said contacts being closed to energize the first device through one of its energization circuits, means on said first device to open one of said set of contacts to deenergize itself and to close a contact in one energization circuit of the next succeeding device in said sequence to energize the latter, means on each device except the first to operate others of said contacts to open its said one of its energizing circuits in response to energization thereof through said circuit to denergize itself and to close one energizing circuit for the succeeding device in said sequence to energize the latter device and to simultaneously close a contact in the other of its energizing circuits and to open a contact in the other energizing circuit of the next succeeding device and each of said devices, except the first and the last, having means operable to maintain its energizing circuit open and to connect one of the energizing circuits of the next succeeding device to said supply circuit to bypass the device preceding said next succeeding device from said sequence.

9. A control means for effecting the automatic operation of a plurality of electroresponsive devices in a plurality of predetermined sequences comprising, a plurality of electrically operated devices each having a forward sequence energizing circuit and a reverse sequence energizing circuit, means operated by each of said devices to open its forward sequence energizing circuit and close the forward sequence energization circuit of the next succeeding device in said sequence, means operated by each of said devices at the beginning of operation thereof to close its reverse sequence energizing circuit and open the reverse sequence energizing circuit of the preceding device in said forward sequence, and means for selectively energizing said forward sequence and reverse sequence energizing circuits, whereby upon energizing one of said energizing circuits the device last energized by the other energizing circuit will be the first to be energized by the said one energizing circuit.

10. A control means for effecting the automatic operation of a plurality of electroresponsive devices in a plurality of predetermined sequences comprising, a plurality of electrically operated devices each having a forward sequence energizing circuit and a reverse sequence energizing circuit, means operated by each of said devices to open its forward sequence energizing circuit and close the forward sequence energization circuit of the next succeeding device in said sequence and means operated by each of said devices at the beginning of operation thereof to close its reverse sequence energizing circuit and open the reverse sequence energizing circuit of the preceding device in said forward sequence, means for selectively energizing said forward sequence and reverse sequence energizing circuits, whereby upon energizing one of said energizing circuits the device last energized by the other energizing circuit will be the first to be energized by the said one energizing circuit, and each of said devices except the first and the last having means operable to bypass its device from said sequences.

11. A control means for effecting the automatic operation of at least three electroresponsive devices in a plurality of predetermined sequences comprising, interconnected forward sequence energizing circuits and interconnected reverse sequence energizing circuits for each of the devices and each circuit having a plurality of contacts therein, means responsive to the operation of each of said devices to operate substantially simultaneously a predetermined number of said contacts at predetermined positions during its operation to open the energized one of its energizing circuits to deenergize itself and to close the corresponding energizing circuit of the next succeeding device in said sequence, and additionally to close its other energizing circuit and to open the other energizing circuit of the preceding device, and means for selectively energizing said energizing circuits.

12. A control means for effecting the automatic operation of a plurality of electroresponsive devices in a predetermined sequence comprising, at least three electrically operated devices each having an energizing circuit, means operated by each of said devices to open its energizing circuit and close the energizing circuit of the next succeeding device in said sequence, each of said devices except the first and the last having means operable to bypass its device from said sequence, and the energizing circuit for the first of said devices being closed in response to one of the conditions of the operation of some of said devices including the last and the bypassing of the remainder of said devices.

13. A control means for effecting the automatic operation of at least three electroresponsive devices one at a time in a predetermined sequence, each of said devices having an energizing circuit, means for initially energizing the first device in said sequence operated devices and means operated by each of said devices to open its energizing circuit and substantially simultaneously to close the energization circuit of the next succeeding device in said sequence, and means operated by the operation and deenergization of all of said devices to close the energizing circuit for the first device to reenergize the first device in said sequence.

14. A control means for effecting the automatic operation of at least three electroresponsive devices one at a time in a predetermined sequence comprising, interconnected energizing circuits for each of the devices having a plurality of contacts therein, means for initially energizing the first device in said sequence, position responsive means operated by each of said devices to operate a predetermined number of said contacts at a predetermined position during its operation substantially simultaneously to deenergize each device itself and to energize the next succeeding device in said sequence, respectively, the energizing circuit for the first of said devices being closed in response to operation and deenergization of all of said devices for reenergization of said first device.

References Cited in the file of this patent

UNITED STATES PATENTS

| 1,508,770 | Blood | Sept. 16, 1924 |
| 2,085,086 | Drake | June 29, 1937 |
| 2,754,460 | Goldman | July 10, 1956 |
| 2,864,046 | Ailes | Dec. 9, 1958 |

FOREIGN PATENTS

| 694,792 | Great Britain | July 29, 1953 |